United States Patent
Guhl (10) Patent No.: US 9,931,722 B2
(45) Date of Patent: Apr. 3, 2018

(54) CONVEYING SYSTEM WITH CHAIN FOR TRANSPORTING ARTICLES, IN PARTICULAR GOODS, ALONG A PREDETERMINED PATH

(71) Applicant: FERAG AG, Hinwil (CH)

(72) Inventor: Simon Guhl, Wetzikon (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/506,003

(22) PCT Filed: Aug. 20, 2015

(86) PCT No.: PCT/EP2015/069155
§ 371 (c)(1),
(2) Date: Feb. 23, 2017

(87) PCT Pub. No.: WO2016/030273
PCT Pub. Date: Mar. 3, 2016

(65) Prior Publication Data
US 2017/0282317 A1    Oct. 5, 2017

(30) Foreign Application Priority Data

Aug. 27, 2014 (CH) ..................... 1288/14

(51) Int. Cl.
*B65G 17/00* (2006.01)
*B23Q 7/14* (2006.01)
(Continued)

(52) U.S. Cl.
CPC ............. *B23Q 7/14* (2013.01); *B65G 19/025* (2013.01); *B65G 19/265* (2013.01); *B65G 35/06* (2013.01); *B61B 10/00* (2013.01)

(58) Field of Classification Search
CPC ...... B65G 17/005; B65G 17/42; B65G 23/16; B65G 35/06; B65G 19/025; B65G 19/265
(Continued)

(56) References Cited

U.S. PATENT DOCUMENTS 2,619,916 A * 12/1952 Rainier ................... B61B 10/04
104/135
3,033,353 A 5/1962 Burnett et al.
(Continued)

FOREIGN PATENT DOCUMENTS

CA    1 287 009 C    7/1991
DE    203 17 972 U1    5/2005
(Continued)

*Primary Examiner* — Joseph Dillon, Jr.
(74) *Attorney, Agent, or Firm* — Pauley Erickson & Kottis (57) ABSTRACT

A conveyor installation for the transportation of articles along a predefined path includes a running rail, at least one running carriage which is freely movable along the running rail, and a driven engagement device which extends at least in sections along the running rail and which includes a multiplicity of engagement elements movable along the running rail. Reliable and quiet operation is achieved in that the engagement elements are movable back and forth between two stable positions, wherein, in the first stable position, the engagement elements can be moved relative to the at least one running carriage past the running carriage without entering into engagement with the running carriage (non-engagement position), and wherein, in the second stable position, the engagement elements, during a movement relative to the at least one running carriage past the running carriage, compulsorily enter into engagement with the at least one running carriage (engagement position).

21 Claims, 10 Drawing Sheets

(51) Int. Cl.
*B65G 19/26* (2006.01)
*B65G 19/02* (2006.01)
*B65G 35/06* (2006.01)
*B61B 10/00* (2006.01)

(58) Field of Classification Search
USPC ............ 198/463.2, 728, 729, 732; 104/172.3
See application file for complete search history.

(56) References Cited

U.S. PATENT DOCUMENTS

| | | | | |
|---|---|---|---|---|
| 3,503,489 A * | 3/1970 | Selis | ................... | B42C 19/08 |
| | | | | 198/644 |
| 3,799,327 A * | 3/1974 | Schulz | ................ | B65G 19/265 |
| | | | | 104/172.3 |
| 4,004,680 A * | 1/1977 | Warmann | ............... | B65G 19/02 |
| | | | | 104/172.3 |
| 4,885,997 A * | 12/1989 | Wakahayashi | ........ | B61B 10/025 |
| | | | | 104/172.3 |
| 5,350,055 A * | 9/1994 | Lecrone | ................ | B65G 19/02 |
| | | | | 198/718 |
| 5,551,543 A * | 9/1996 | Mattingly | .............. | B65G 13/10 |
| | | | | 198/370.01 |
| 5,606,915 A * | 3/1997 | Harris | .................... | B61B 10/02 |
| | | | | 104/172.4 |
| 6,367,612 B1 | 4/2002 | Dosso et al. | | |
| 6,378,693 B1 * | 4/2002 | Ballestrazzi | ......... | B65G 19/265 |
| | | | | 198/728 |
| 6,554,127 B1 * | 4/2003 | Kroll | .................... | B61B 10/025 |
| | | | | 104/172.4 |
| 7,255,220 B2 * | 8/2007 | Iwai | ...................... | B65G 35/08 |
| | | | | 104/172.1 |
| 7,779,992 B2 * | 8/2010 | Webster | .................. | B65G 19/02 |
| | | | | 104/172.3 |
| 8,328,003 B2 * | 12/2012 | Webster | ................ | B66B 31/006 |
| | | | | 104/172.3 |
| 8,915,351 B2 * | 12/2014 | Tomida | .................. | B65G 19/02 |
| | | | | 198/728 |
| 2003/0079962 A1 * | 5/2003 | Cerutti | ................... | B65G 47/31 |
| | | | | 198/459.1 |
| 2007/0209909 A1 * | 9/2007 | Fourney | ................. | B65G 17/24 |
| | | | | 198/728 |
| 2008/0217137 A1 * | 9/2008 | Lenherr | .................. | B65B 35/24 |
| | | | | 198/717 |
| 2009/0173603 A1 * | 7/2009 | Hayashi | ............... | B61B 13/127 |
| | | | | 198/735.1 |
| 2010/0200371 A1 * | 8/2010 | Reuteler | ................... | B31B 1/78 |
| | | | | 198/730 |
| 2015/0259145 A1 * | 9/2015 | Fenile | .................... | B65G 17/12 |
| | | | | 198/803.3 |
| 2017/0225693 A1 * | 8/2017 | Fenile | ...................... | B61B 3/00 |

FOREIGN PATENT DOCUMENTS

| | | |
|---|---|---|
| DE | 10 2005 006 455 A1 | 8/2006 |
| DE | 10 2011 119 411 A1 | 5/2013 |
| FR | 2 176 090 A1 | 10/1973 |
| JP | S58-100862 U | 7/1983 |
| JP | H07 267340 A | 10/1995 |
| WO | WO 97/23386 A1 | 7/1997 |

\* cited by examiner

Fig.8
Section A-A

CONVEYING SYSTEM WITH CHAIN FOR TRANSPORTING ARTICLES, IN PARTICULAR GOODS, ALONG A PREDETERMINED PATH

BACKGROUND OF THE INVENTION

Field of the Invention

The present invention relates to the field of conveyor technology. It relates to a conveyor installation for the transportation of articles, in particular goods, along a predefined path.

Discussion of Related Art

For the automatic conveyance of articles, such as for example items of clothing suspended on hangers, along rails led through a space, the prior art has disclosed a multiplicity of systems which fall under the term "Power and free" and which are distinguished by the fact that the articles suspended on running carriages are moved forward by drivers which run in parallel and which are driven and which are in engagement and which, if the running carriage encounters an obstruction, automatically pass out of engagement and are moved past the stopped running carriage.

Document DE 10 2005 006 455 A1 discloses a transport system for suspended articles, in particular for items of clothing suspended on hangers, having a transport rail, having a drive chain which is arranged so as to be movable in a conveying direction in the transport rail and which has downwardly projecting drivers, and having holding elements for the articles, which holding elements are mounted in the transport rail, below the drive chain, by way of running rollers and which are movable in the conveying direction by way of the drive chain. The transport system is distinguished by the fact that the drivers are of bolt-like form, in that the holding elements are mounted in the transport rail in pendular fashion only about one pair of rollers and have upwardly protruding projections for engaging into the drive chain between two adjacent drivers, and in that, between the transport rail and the holding elements, there are provided means which prevent projection and driver from passing out of engagement in the presence of a predefined maximum inclination of the holding element relative to a normal with respect to the transport rail in a vertical transport plane spanned by the conveying direction.

Document DE 10 2011 119 411 A1 discloses a retroactively installable stopper unit for a suspended conveyor, which stopper unit transports a pawl-type driver, in an at least unilaterally open slot of a support rail on which hangers are transported in sliding fashion by way of pawl-type drivers, downstream in a conveying direction which is oriented parallel to the longitudinal direction of the support rail. The stopper unit comprises a guide which is fastenable to the suspended conveyor, a carriage which has an abutment section, wherein the carriage is, by way of the guide, mounted so as to be movable preferably linearly in a transverse direction which is oriented transversely with respect to the longitudinal direction; and a drive which is coupled to the carriage and which is designed such that, during the activation thereof, said drive deploys the carriage from a release position, in which the abutment section of the carriage does not project beyond the rail, such that the hangers can pass by the carriage, along the transverse direction into a stop position, in which the abutment section projects beyond the support rail, preferably over the entire width thereof, wherein, when the drive is activated, in the event of a force acting in the transverse direction, the carriage can be retracted into the release position, and in the event of a force acting exclusively in the longitudinal direction, the carriage remains in its present position.

The document DE 203 17 972 U1 describes a suspended conveyor installation having a conveyor rail, having a driveable conveyor device which is arranged above the conveyor rail, having pawl-type drivers which are attached to the conveyor device and which are oriented relative to the conveyor rail and which serve for transporting hanger hooks, which are situated displaceably on the conveyor rail, in a conveying direction, wherein each pawl-type driver has a carrier connected to the conveyor device and has a pawl, which pawl has a driver hook which follows in the conveying direction and which pawl is hinged at the carrier by way of a pivot spindle which is arranged laterally with respect to and above the conveyor rail and at an acute angle (d) of at most 60° with respect to the conveying direction. The document U.S. Pat. No. 6,367,612 B1 discloses an extendable driver for an overhead accumulating conveyor system ("power and free") which comprises a body section composed of a rectangular cylinder which is equipped with a spring and slider element within the cylinder. If a force greater than the static spring force acts on the slider element, the slider element retracts into the body section, such that the structural height of the driver is reduced. Owing to its automatic retraction, the retractable driver does not require any modification to the driven and free rails or to the running carriages.

All known systems operate with engagement configurations which are duly released when an obstruction is encountered but which then retract again into a stable engagement basic position. Owing to this "monostable" mode of operation, the use of the known systems is restricted. Furthermore, the monostable mode of operation is associated with considerable noise generation, for example because, when a stopped running carriage is "passed over" by the successive drivers which are in each case deflected and retract into their initial state again, a rattling noise is generated.

SUMMARY OF THE INVENTION

It is therefore an object of the invention to specify a conveyor installation which makes it possible to realize greater flexibility and quiet operation.

These and further objects are achieved by way of the features of claim 1.

Refinements of the solution according to the invention will emerge from the dependent claims.

The conveyor installation according to the invention for the transportation of articles, in particular goods, along a predefined path comprises a running rail and comprises at least one running carriage which runs on said running rail and which is freely movable along the running rail, and furthermore comprises a driven engagement device which extends at least in sections along the running rail and which comprises a multiplicity of engagement elements which are movable along the running rail and which, for the purposes of controlling the movement of the at least one running carriage, can be placed in engagement with the running carriage.

Said conveyor installation is distinguished by the fact that the engagement elements are movable back and forth between two stable positions, wherein, in the first stable position, the engagement elements can be moved relative to the at least one running carriage past the running carriage without entering into engagement with the running carriage (non-engagement position), and wherein, in the second stable position, the engagement elements, during a movement relative to the at least one running carriage past the running carriage, compulsorily enter into engagement with the at least one running carriage (engagement position).

One refinement of the conveyor installation according to the invention is characterized in that the engagement elements are, in the engagement device, arranged one behind the other, and so as to be spaced apart uniformly from one another, in the movement direction.

One refinement of the conveyor installation according to the invention is characterized in that the engagement elements are in each case mounted so as to be pivotable about a swivel axis, and can be moved from one stable position into the other by way of a pivoting movement about the swivel axis.

In particular, the engagement elements each lock with detent action in the two stable positions.

In particular, the detent position of the engagement elements in the second stable position is configured such that the detent position of one engagement element is eliminated and the engagement element is pivoted into a first stable position if a force acting counter to the movement direction and of a predetermined magnitude acts on said engagement element.

In particular, the engagement elements, during the pivoting, move in each case along a detent element which is static relative to the swivel axis, and in the two stable positions, each lock with detent action, by way of a recess, at the detent element.

In particular, the detent element is in the form of a detent bolt oriented parallel to the swivel axis, and the recesses on the engagement element are in the form of detent depressions.

In particular, the engagement elements are in the form of approximately V-shaped hooks which lie in the pivoting plane and which have two limbs which are connected to one another at one side, wherein the engagement elements are in each case pivotably mounted at the free end of the second limb, and wherein, on the free end of the first limb, there is formed a contact head by way of which the engagement element enters into engagement, in the engagement position, with the running carriage.

Another refinement of the conveyor installation according to the invention is characterized in that the engagement elements are attached to a chain which is driven and which is movable in sections along the running rail, and in that the swivel axis of each engagement element in each case coincides with a joint axis of the chain.

In particular, the chain is in the form of an endless chain and is guided over at least two diverting wheels. Here, the chain may also be in the form of a roller chain.

In particular, the chain, in the section in which it is moved along the running rail for the purposes of engagement, is guided in a guide rail such that the engagement elements arranged on the chain are situated and move outside the guide rail.

In particular, a mechanism is provided by way of which engagement elements situated in the non-engagement position can be moved back into the engagement position.

In particular, the mechanism comprises a static sliding guide which is tracked by the engagement elements that are moved past.

In particular, means for tracking the sliding guide are arranged on the engagement elements.

In particular, the tracking means comprise a tracking roller arranged rotatably on each engagement element.

Alternatively, the tracking means may comprise a tracking cam formed on each engagement element.

It is however also conceivable for the mechanism to comprise movable pressing means which, in order to pivot the engagement elements, are pressed against the engagement elements that are moved past.

In particular, the pressing means comprise, on a synchronously running chain, pressing elements which are moved against the engagement elements.

It is however also conceivable for the pressing means to comprise at least one static pressing unit with an active element which can be moved against the engagement elements that are moved past.

Another refinement of the conveyor installation according to the invention is characterized in that the engagement elements are designed such that, in the second stable position, they can pass by the running carriage in the case of a relatively fast movement of the at least one running carriage. In this way, operating states are possible in which the running carriage, for example owing to drive action imparted by a continuous conveyor, moves faster than the engagement elements, that is to say can, in effect, "overtake" the engagement elements.

In particular, in this case, the engagement elements are in the form of approximately V-shaped hooks which lie in a pivoting plane and which have two limbs which are connected to one another at one side, wherein the engagement elements are in each case pivotably mounted at the free end of the second limb, wherein, at the free end of the first limb, there is formed a contact head by way of which the engagement element enters into engagement, in the engagement position, with the running carriage, wherein the engagement elements are, at least in the region of the limbs, composed of an elastically deformable material, and wherein the limbs of the engagement elements are divided, in each case by a slot lying in the pivoting plane, into two similar limb parts which are spread apart when a relatively fast-moving running carriage passes by.

Furthermore, it may be provided that, in the case of the engagement elements, in each case on the outer side in the region of the first limb, there is formed a run-in funnel which opens into the slot and which permits or facilitates the spreading-apart of the limb parts by an engagement element attached to the running carriage.

BRIEF DESCRIPTION OF THE DRAWINGS

The invention will be explained in more detail below on the basis of exemplary embodiments in conjunction with the drawing. In the drawing.

DETAILED DESCRIPTION OF THE INVENTION

Figure 1:
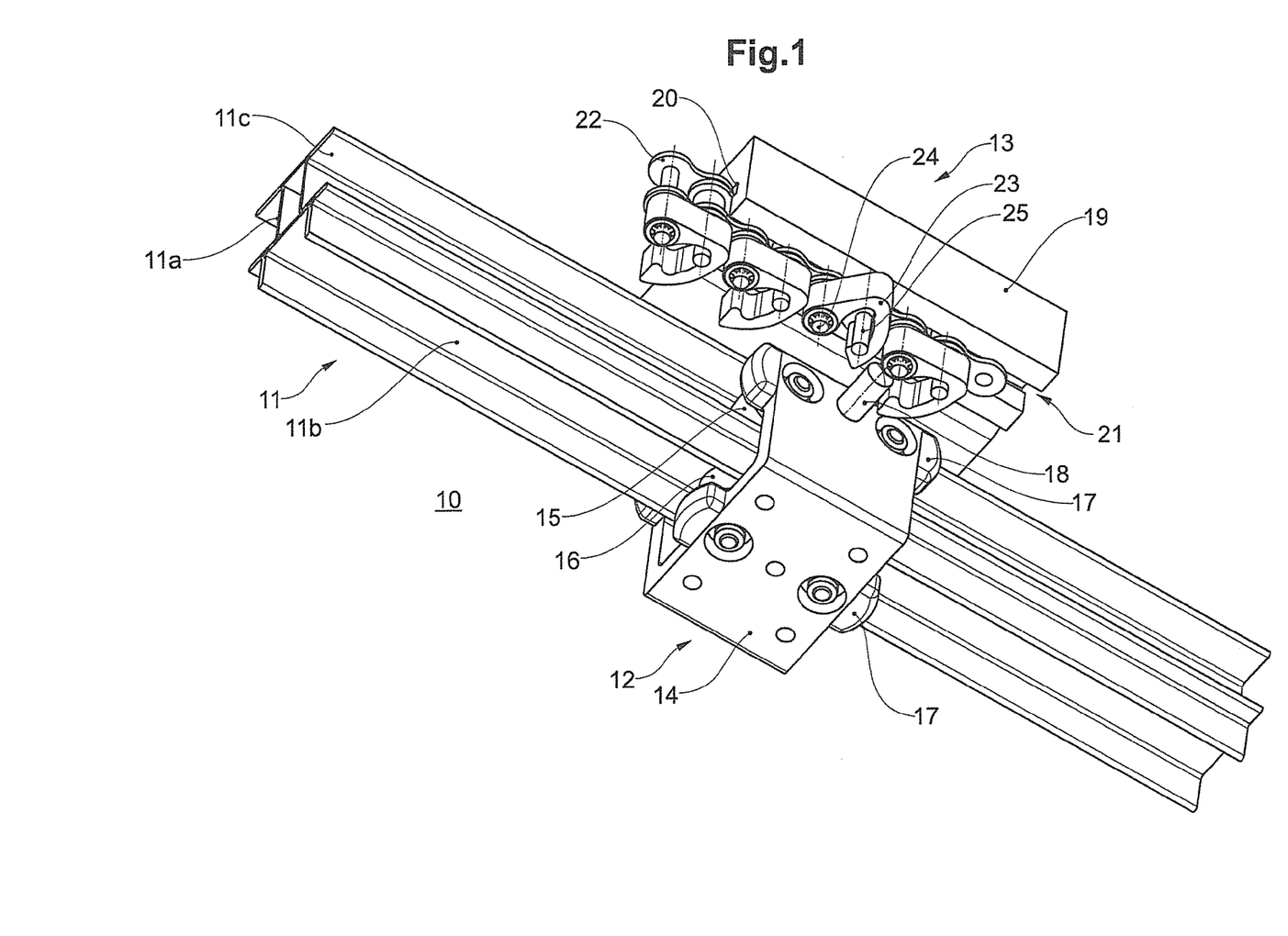
FIG. 1 shows, in a perspective illustration (in a view from below), a detail of a conveyor installation as per an exemplary embodiment of the invention.

FIG. 1 shows, in a perspective illustration (in a view from below), a detail of a conveyor installation as per an exemplary embodiment of the invention. The conveyor installation 10 of FIG. 1 comprises a running rail 11 which is guided through the space, which is fastened in suspended or some other fashion and of which, in FIG. 1, only a short section is depicted by way of example, and which may have curves and upwardly sloping and downwardly sloping sections. On the running rail 11, individual running carriages, of which one running carriage 12 is depicted by way of example in FIG. 1, can move substantially freely along the running rail.

The running rail 11 has, in cross-sectional profile, three outwardly open C-shaped or U-shaped profile sections 11a, 11b and 11c, which are arranged mirror-symmetrically with respect to a vertical central plane. If the running carriage 12 engages, by way of its carriage body of U-shaped profile, around the running rail 11 from below, the profile sections 11a and 11c which are open towards the sides serve as support rails, in which the running carriage 12 runs by way of corresponding running rollers 15, which are provided in pairs. The downwardly open profile section 11b performs guide tasks, and receives the guide rollers 16 of the running carriage 12, which are likewise provided in pairs.

At front and rear sides of the running carriage 12, at multiple locations, there are arranged elastically deformable buffers 17 which cushion the abutment of multiple running carriages 12 running one behind the other on the running rail 11.

The running carriages 12 do not have a dedicated drive, but are either set in motion by the action of gravitational force on downward-sloping sections, or must be moved forward and upward or else braked by way of drive mechanisms which are arranged externally adjacent to the running rail 11 and which will be described in more detail below. For corresponding engagement from the outside, laterally protruding and oppositely situated engagement elements 18 are attached to the running carriage 12, which engagement elements are in the form of bolts in the example illustrated. The running rail 11 and running carriage 12 in the illustrated form are the subject of separate patent applications.

Figure 8:
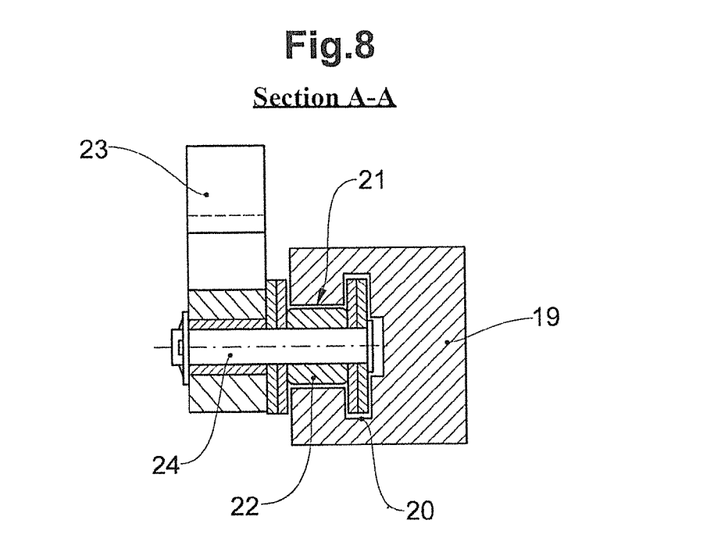
FIG. 8 shows the section through the guide rail of the chain equipped with the engagement elements with the chain guided therein.

For the (activatable and re-releasable) drive of the individual running carriage 12, there is provided, as per FIG. 1, an engagement device 13 which comprises a chain 22 equipped with pivotable engagement elements 23, which chain, guided in a guide rail 19, runs parallel to the running rail 11 at least in sections. The guidance of the chain 22 in the guide rail 19 is shown in detail, in a section, in FIG. 8. The chain 22 slides by way of one side in a guide groove 20 in the guide rail 19 and projects by way of the other side out through an opening slot 21. The engagement elements 23 are arranged pivotably on said externally situated side of the chain 22. Here, an (elongated) joint axis of the chain 22 serves in each case as swivel axis 24 for the engagement elements 23.

Figure 2:
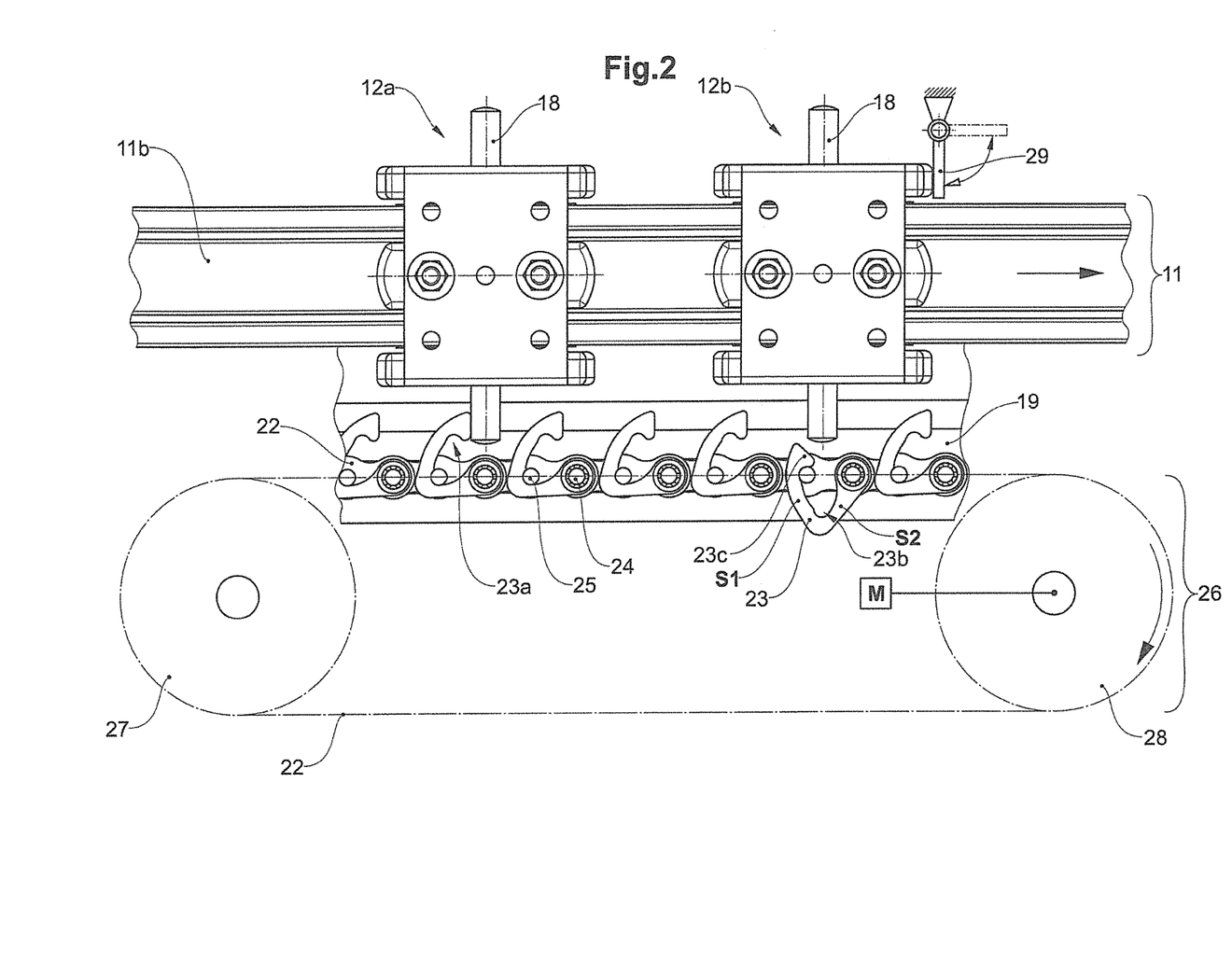
FIG. 2 shows a conveyor installation from FIG. 1 with the drive unit for the chain equipped with the engagement elements in an accumulating operating mode.
Figure 7:
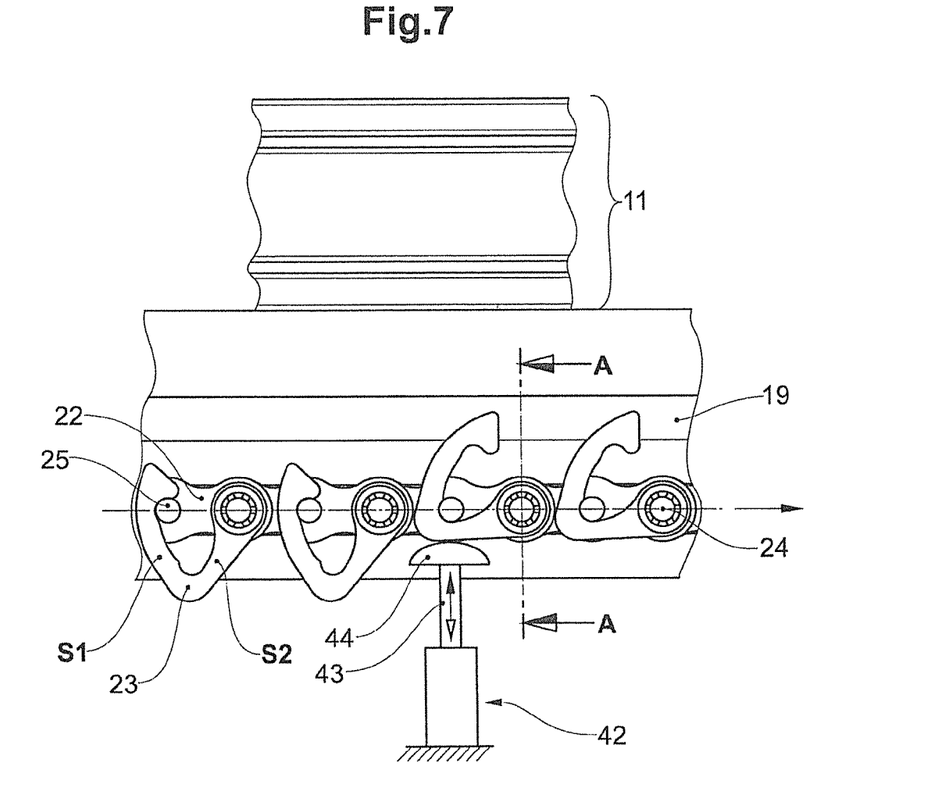
FIG. 7 shows the pivoting of the engagement elements into the engagement position by way of a static pressing unit.

The engagement elements 23 are in the form of approximately V-shaped hooks which lie in the pivoting plane and which have two limbs S1 and S2 which are connected to one another at one side (see FIG. 2 or 7). At the free end of the second limb S2, the engagement element 23 is mounted in each case pivotably on the chain 22. At the free end of the first limb S1 there is formed a contact head 23c by way of which the engagement element 23, in the engagement position, enters into engagement with the associated engagement element 18 on the running carriage 12 (see e.g. the entire left-hand engagement element in FIG. 2).

The pivoting mechanism of the engagement elements 23 is designed such that the engagement elements 23 can in each case be pivoted back and forth between two stable positions. In one stable position (see for example the two right-hand engagement elements in FIG. 7), the engagement elements 23 compulsorily enter into engagement, by way of the engagement element 18, with a running carriage 12 when the latter is driven along by the engagement elements 23 during a forward movement of the chain 22. In the other stable position (see for example the two left-hand engagement elements in FIG. 7), the engagement elements 23 have been pivoted back out of the movement path of the engagement elements 18, such that engagement is not possible (non-engagement position). It is self-evident that the dimensions (length) of the engagement elements 18, and the arrangement (spacing) of the chain 22 relative to the running rail and the pivoting range of engagement elements 23 must be coordinated with one another such that this behaviour is possible.

The two stable (end) positions of the engagement elements 23 as per FIG. 7 are defined by a detent mechanism which, for each engagement element 23, provides a detent element 25, which is arranged in the interior region of the engagement element and which is in the form of a circular bolt, and two detent depressions 23a and 23b, which are formed on the inner side of the limb S1 (FIG. 2). The bolt-like detent element 25 is, for the respective engagement element, arranged on the exact next chain joint that follows the swivel axis. One detent depression 23a is arranged on the free end of the limb S1 directly in front of the contact head 23c. The other detent depression 23b is situated immediately in front of the transition from the limb S1 to the limb S2. When the engagement element 23 engages by way of the inner detent depression 23b on the detent element 25 (see the two right-hand engagement elements 23 in FIG. 7), the engagement element is situated in the stable engagement position. By contrast, when the engagement element 23 engages by way of the outer detent depression 23 on the detent element 25 (see the two left-hand engagement elements 23 in FIG. 7), the engagement element 23 is situated in the stable neutral position, in which engagement is not possible (non-engagement position). It is self-evident that, for functioning of the described detent mechanism, sufficient flexible elasticity of engagement element 23 in the pivoting plane is necessary.

As emerges from the schematic illustration of FIG. 2, the chain 22 is part of a drive unit 26 which has two diverting wheels 27 and 28, of which at least one is motor-driven (motor M) and over which the chain 22, as an endless chain, is guided. The illustration shows the situation in the accumulating operating mode, in which an abutment 29 which can be pivoted into the running path of the running carriages 12a, 12b limits the free forward running of the running carriages. Firstly, the running carriages 12a, 12b are driven along by engagement elements 23, which have been pivoted into the engagement position, by means of the chain 22 which is moving to the right, until a running carriage 12b strikes the abutment 29 and is stopped. This generates, by way of the engagement element 18 which is in engagement with the associated engagement element 23, an opposing force which acts counter to the running direction and which pivots the engagement element 23 of the stopped running carriage 12b out of the stable engagement position into the stable non-engagement position, where the engagement element then locks with detent action.

Figure 3A:
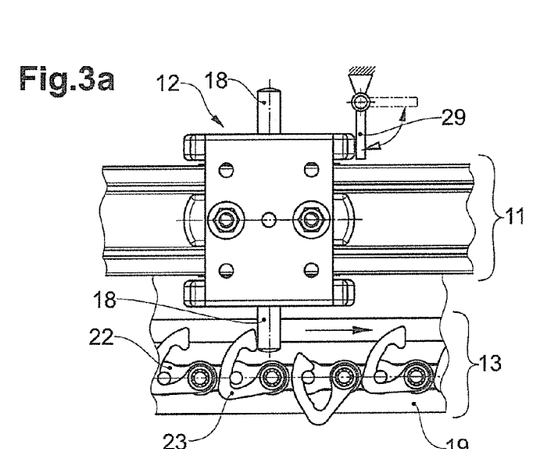
FIG. 3 shows, in various steps (FIGS. 3(a) to (d)), the behaviour of the engagement elements of the conveyor installation from FIG. 1 in the accumulating operating mode.
Figure 3B:
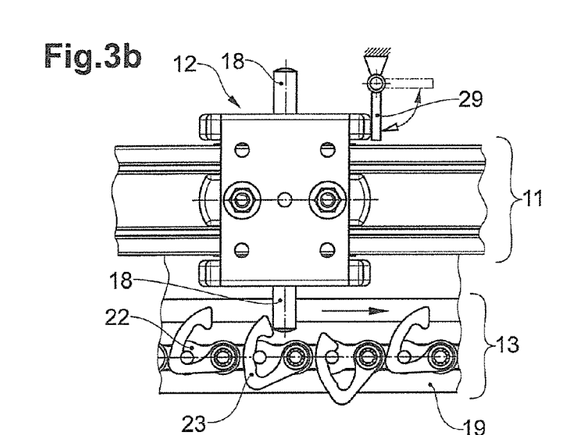
Figure 3C:
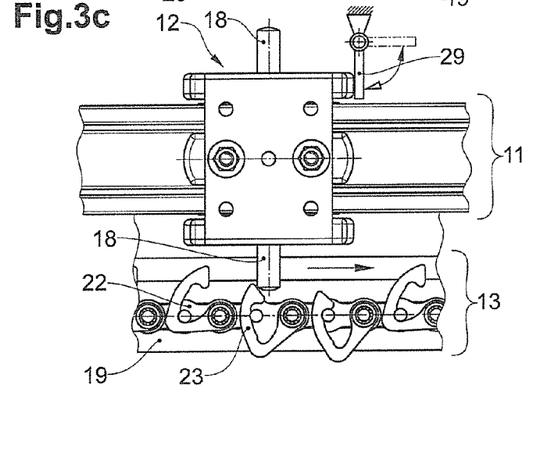
Figure 3D:
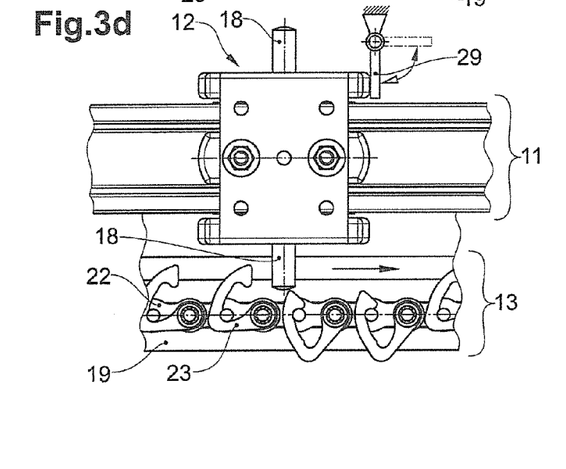

The individual phases of said process are depicted once again in sub-figures (a) to (d) of FIG. 3, where FIG. 3(a) illustrates the fully engaged situation, which leads, via multiple intermediate steps (b) and (c), to the fully pivoted-out situation in FIG. 3(d). The same process occurs if further arriving running carriages, such as the running carriage 12a in FIG. 2, strike the already-stopped running carriage 12b and the associated engagement element 23 is likewise pivoted out of engagement owing to the opposing force that is generated.

Since, in the case of an accumulating operating mode of said type, an ever greater number of engagement elements 23 are pivoted out of the engagement position and cannot pass into the engagement position again of their own accord, a mechanism is provided, as per FIGS. 4-7, which pivots the individual engagement elements 23 from the non-engagement position back into the engagement position in targeted and controlled fashion.

Figure 4:
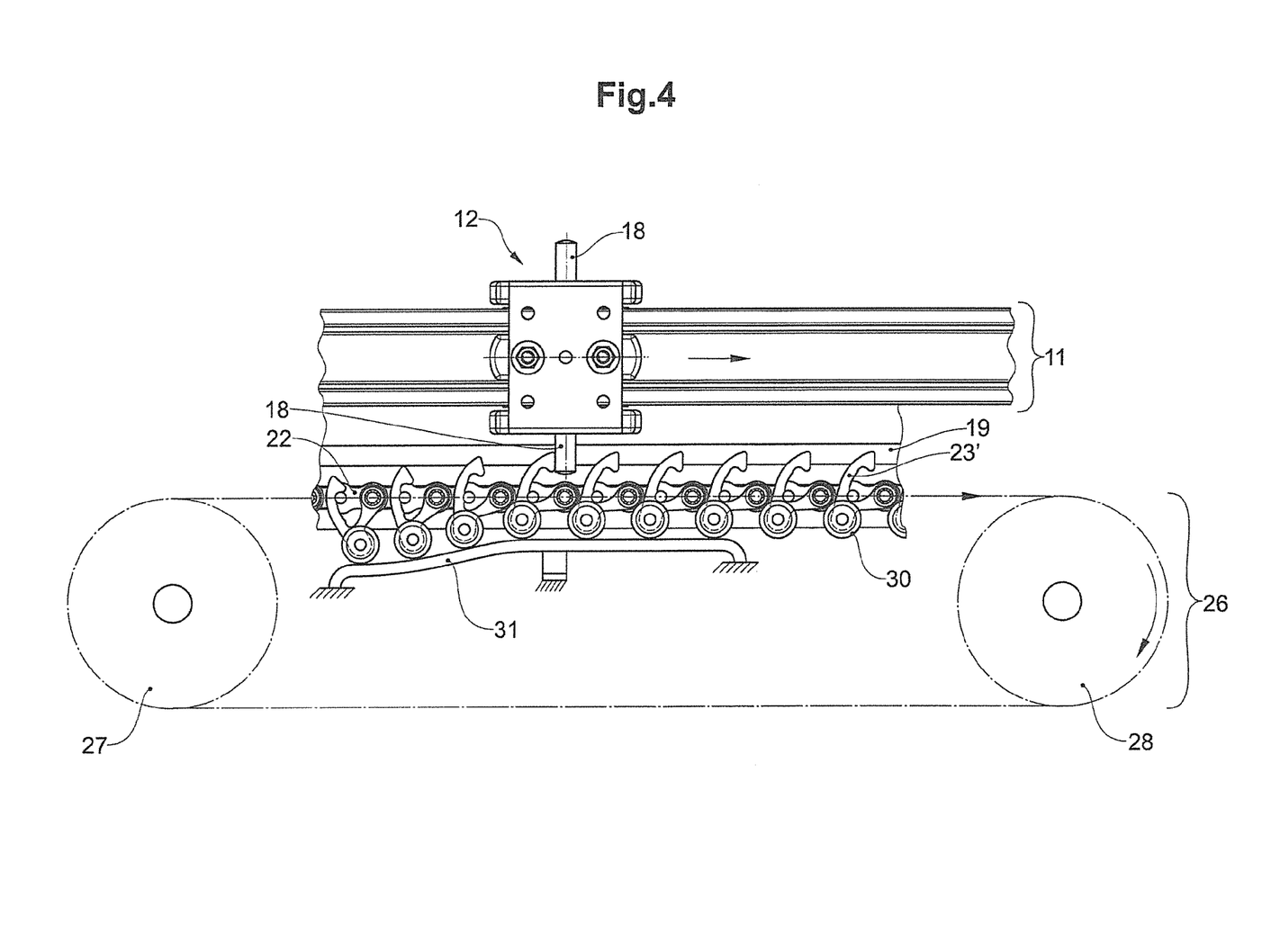
FIG. 4 shows a conveyor installation as per another exemplary embodiment of the invention, in which the engagement elements are pivoted into the engagement position by virtue of tracking rollers running on a sliding guide.

A first such mechanism is depicted in FIG. 4. For this purpose in this refinement, the engagement elements 23' are equipped in each case with a tracking roller 30 arranged rotatably on the tip of the "V", by way of which tracking roller the engagement element 23', during the movement of the chain 22, tracks a sliding guide 31 arranged under said chain. Said sliding guide 31 has an upwardly sloping section which, by way of the tracking roller 30, causes the engagement element 23' that is moved by way of said tracking roller to be released from the stable non-engagement position and pivoted into the engagement position.

Figure 5:
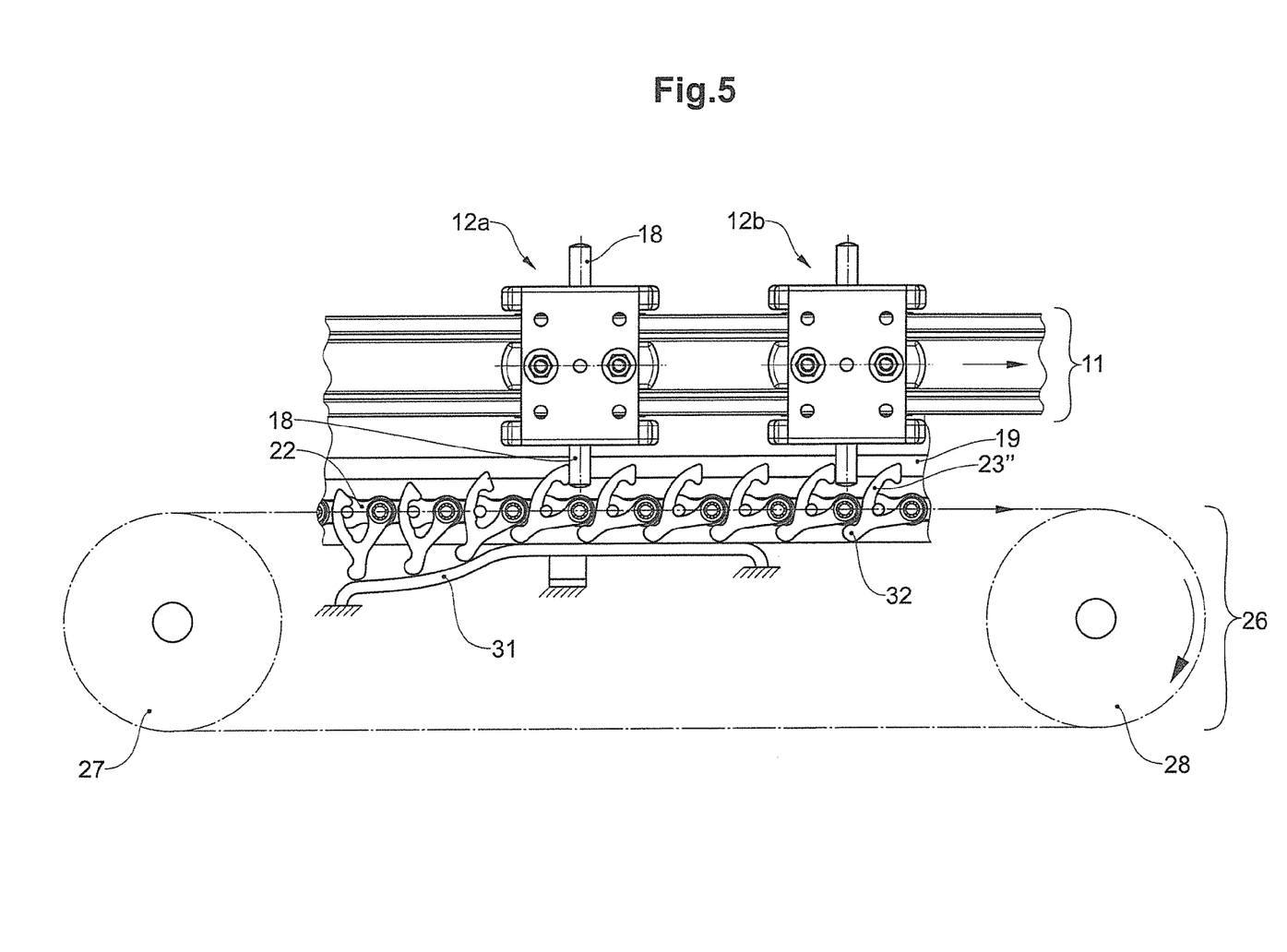
FIG. 5 shows a further exemplary embodiment similar to FIG. 4, in which the engagement elements are pivoted into the engagement position by virtue of tracking cams running on a sliding guide.

Another refinement of a mechanism of said type is illustrated in FIG. 5. Here, the engagement elements 23" are, at the tip of the "V", equipped in each case with a tracking cam 32, which in turn travels along a corresponding sliding guide 31.

Figure 6:
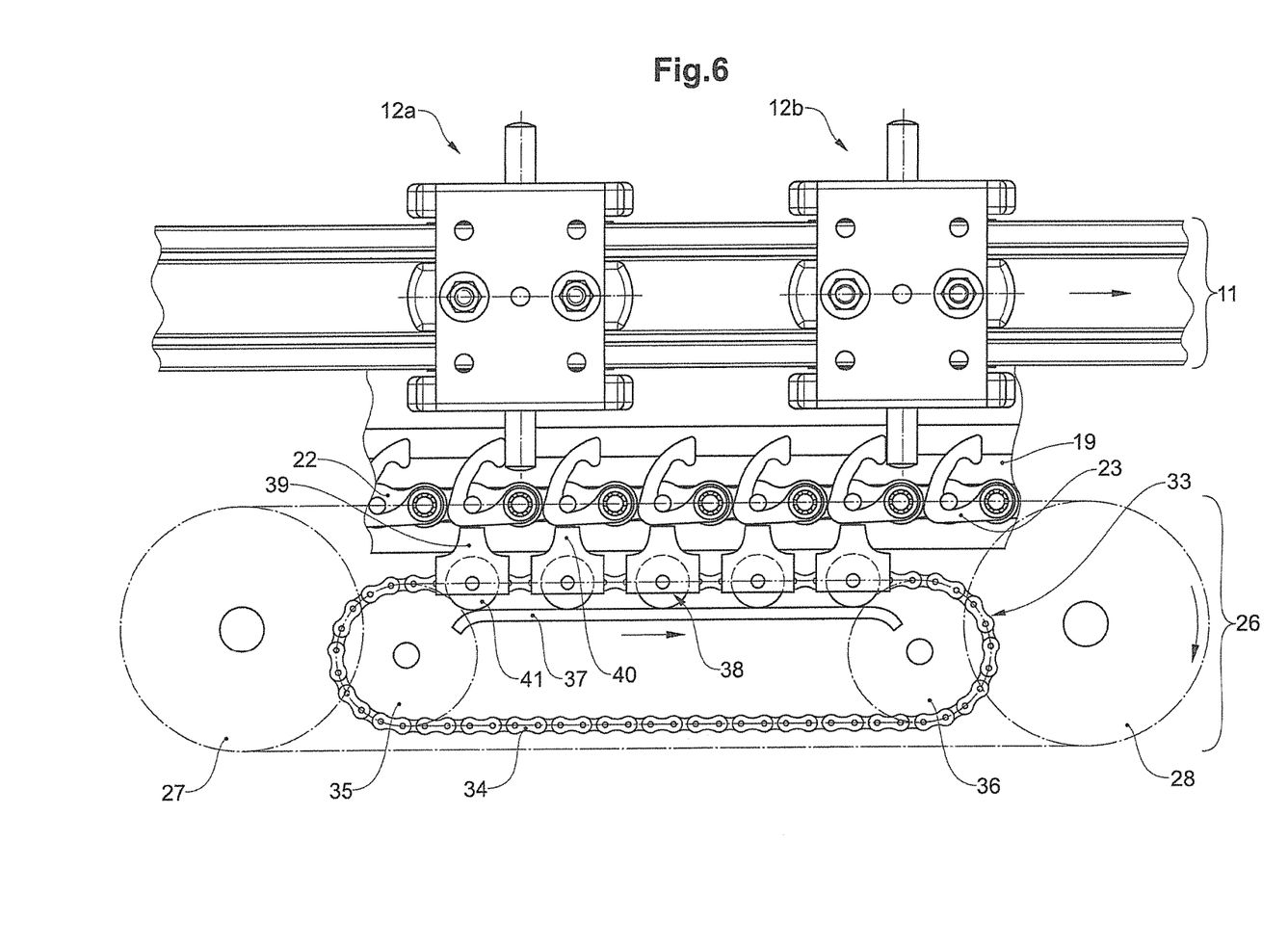
FIG. 6 shows a further exemplary embodiment similar to FIGS. 4 and 5, in which the engagement elements are pivoted into the engagement position by way of jointly running pressing elements.

It is however also conceivable, as per FIGS. 6 and 7, for active mechanisms to be provided for pivoting the engagement elements 23 back into the engagement position. In FIG. 6, by way of a further drive unit 33 with a chain 34 and diverting wheels 35, 36, pressing elements 38 are, in a parallel section, moved synchronously along the chain 22 with the engagement elements 23, wherein the pressing elements 38, which in said section are supported in each case by way of a roller 41 on a support rail 37, are, by way of their pressing body 39 which has an active element which is oriented toward the engagement elements 23 and which is in the form of a fixed plunger 40, pressed by way of said plunger 40 against the limb S2 of the associated engagement element, and thus presses or pivots said engagement element into the engagement position. It is self-evident that, instead of the plunger 40, it is also possible for a roller or the like to be used as an active element.

As per FIG. 7, it is however also possible for an individual, static pressing unit 42 to be provided which, by way of a deployable rod 43 with a pan-head-like plunger 44 (or a roller or the like) attached to the front end of the rod 43, presses against the limb S2 of an engagement element that is moving past. If a pressing unit 42 of said type is controlled in a manner coordinated with the movement of the chain 22, it is possible for individual selected engagement elements 23 to be activated. If the plunger 44 remains deployed for a certain period of time, it is possible for multiple engagement elements 23 to be activated in succession.

At this juncture, it is pointed out that the engagement elements 23 may not only set running carriages 12 in motion, as has primarily been discussed, but may also brake freely moving running carriages 12. Thus, if for example the running carriage 12a shown in FIG. 2 is moving faster than the chain 22 running adjacent thereto (e.g. owing to a downward slope), said running carriage is, by way of its engagement element 18, released from the associated engagement element 23 at the far left in FIG. 2. Said free movement is then braked again, and reduced to the chain speed, when said running carriage has overtaken the next non-activated engagement element (second from the left) and abuts, by way of its engagement element 18, against the outer side of the limb S1 of the next engagement element (third from the left).

All of the figures illustrate a chain 22 on which the engagement elements 23 are arranged with the maximum density. It is however self-evidently also conceivable for chain links without an engagement element to be interposed, if this is necessitated or made possible by the usage situation. Likewise, in the context of the invention, other types of detent mechanisms are conceivable for ensuring the two stable positions of the engagement elements.

Figure 9:
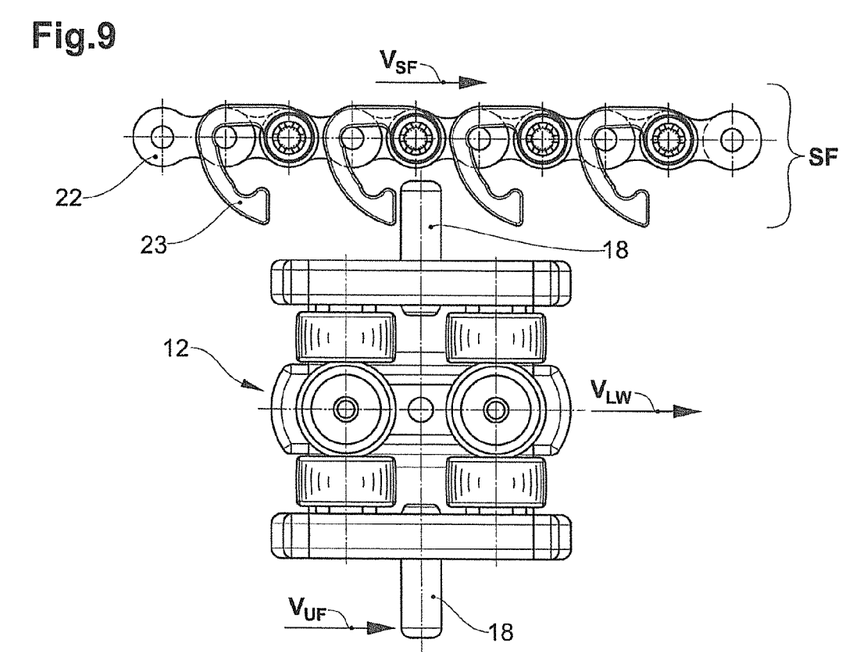
FIGS. 9 and 10 show the problem that arises if a running carriage is, for example by way of a continuous conveyor (UF) engaging on one side, moved faster than an accumulating conveyor (SF) engaging on the other side.
Figure 10:
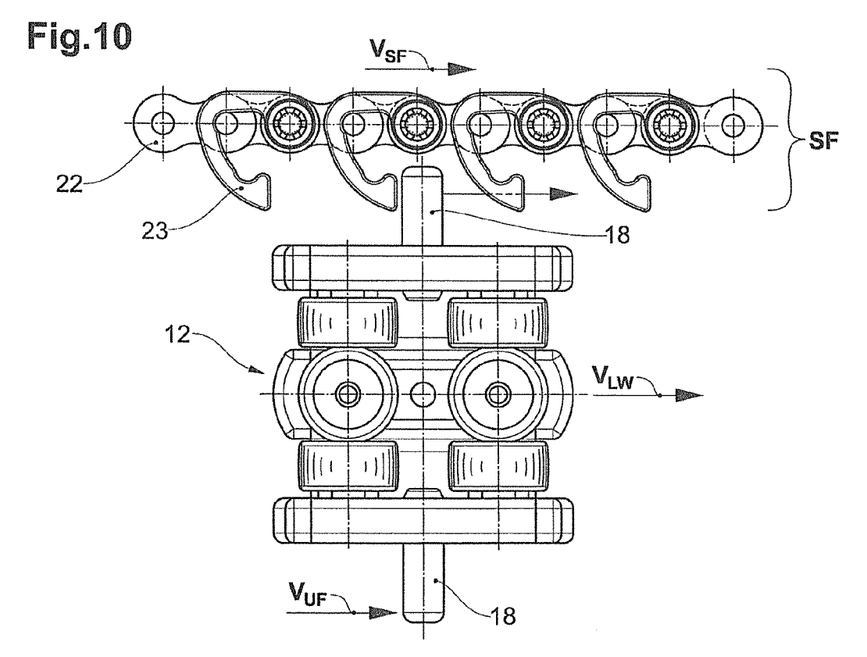

In the case of an accumulating conveyor of the type shown in FIG. 1, a problem may arise, which can be discussed on the basis of FIGS. 9 and 10: If the running carriage 12 is connected on one side to an accumulating conveyor SF and is driven on the other, opposite side by, for example, a continuous conveyor UF (not explicitly illustrated in FIGS. 9 and 10), three separate speeds may arise, specifically the speed $V_{SF}$ of the accumulating conveyor SF, the speed $V_{LW}$ of the running carriage 12 and the speed $V_{UF}$ of the continuous conveyor (not shown) (FIG. 9).

With the exemplary embodiments shown in the preceding figures, it is not possible for a running carriage 12 to move faster than the chain of the accumulating conveyor SF. If $V_{UF}=V_{LW}>V_{SF}$, the engagement element 23 which strikes the carriage 12 is pivoted from the engagement position into the non-engagement position. By contrast, if $V_{UF}=V_{LW}>V_{SF}$, the running carriage, by way of the engagement element 18, strikes the next engagement element 23 (from behind), and a collision occurs. This greatly restricts the range of possible installation concepts for corresponding conveying installations.

To obtain greater degrees of freedom in installation concepts, it would be desirable if, in a situation where $V_{LW}>V_{SF}$, the accumulating conveyor SF allowed the running carriage, with its engagement element 18, to pass by without great obstruction (indicated in FIG. 10 by the arrow at the upper engagement element).

This demand is satisfied if the engagement elements are designed such that, in the second stable position, they can allow the running carriage 12 to pass by in the case of a relatively fast movement of the at least one running carriage 12.

Figure 11:
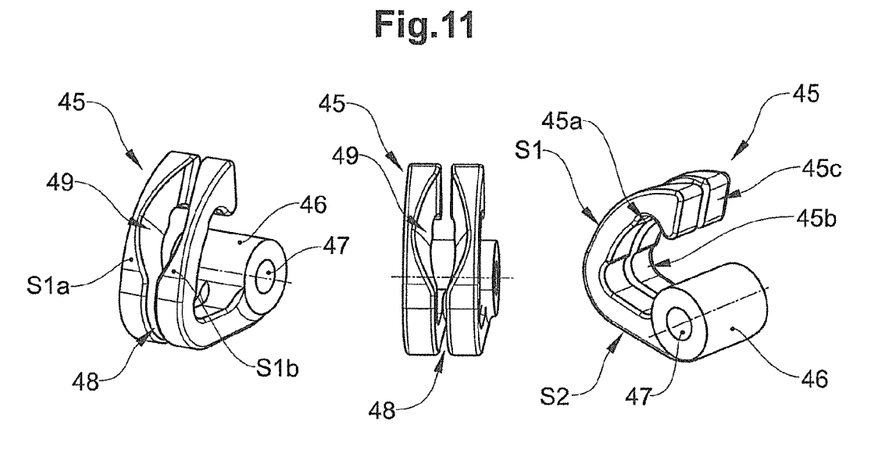
FIG. 11 shows side views, from different perspectives, of an engagement element or driver which allows the running carriage to move at a higher speed than an accumulating conveyor.

An engagement element of said type is shown from various perspectives in FIG. 11. The engagement element 45 from FIG. 11 is similar, in terms of its external shape, to the engagement elements 23 shown in the preceding figures. Said engagement element is in the form of an approximately V-shaped hook which lies in a pivoting plane and which has two limbs S1 and S2 which are connected to one another at one side. The engagement element 45 has, integrally formed on the free end of the second limb S2, a hub 46 with an axial bore 47 which serves for the pivotable mounting. On the free end of the first limb S1 there is formed a contact head 45c by way of which the engagement element 45, in the engagement position, enters into engagement with the running carriage 12. The special feature now consists in the fact that the engagement element 45 is, at least in the region of the limbs S1 and S2, composed of an elastically deformable material, e.g. polyoxymethylene (POM), and that the limbs S1 and S2 are, as far as the hub 46, divided by a slot 48, which lies in the pivoting plane, into two similar limb parts S1a, b (FIG. 11) and S2a, b (FIG. 13) which, when a relatively fast-moving running carriage 12 passes by, are spread apart by the engagement element 18 of said running carriage such that the running carriage 12 can pass by.

In order that this is particularly easily possible without the spreading also occurring in the opposite direction, it is provided that, in the case of the engagement element 45, a run-in funnel 49 which opens into the slot 48 is formed on the outer side in the region of the first limb S1. To initiate the spreading process, the engagement element 18 on the running carriage enters into said run-in funnel 49 and, owing to the oblique funnel walls, spreads in particular the limb parts S1a and S1b elastically apart from one another, to such an extent that said engagement element can pass by.

Figure 12:
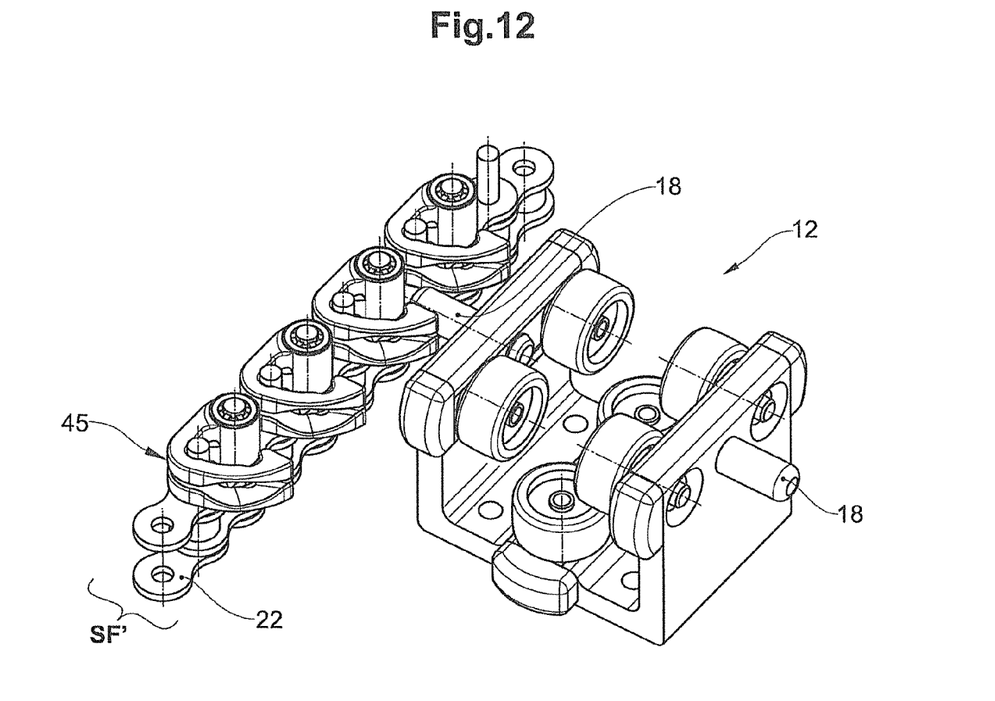
FIG. 12 shows an accumulating conveyor (SF'), equipped with engagement elements as per FIG. 11, in interaction with a running carriage.
Figure 13:
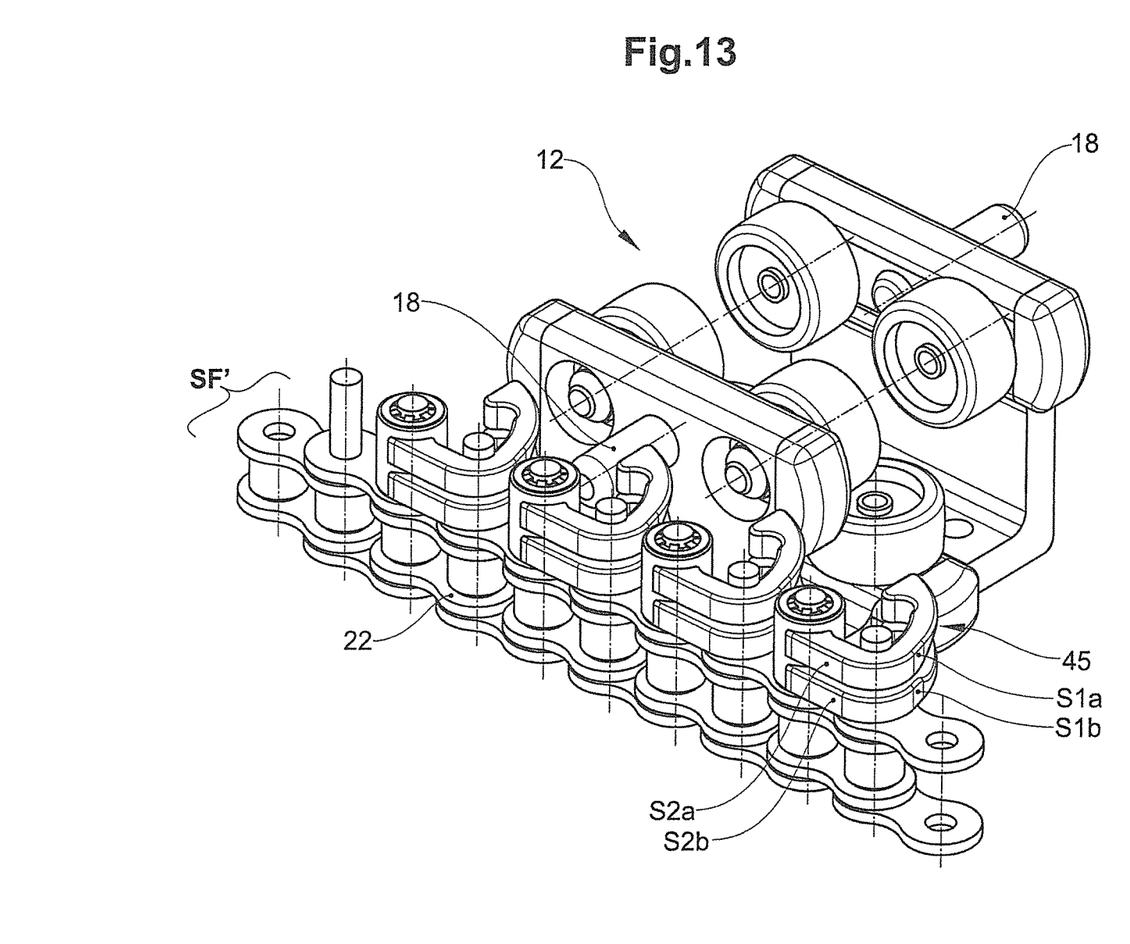
FIG. 13 shows the configuration from FIG. 12 from a different perspective.

FIGS. 12 and 13 show, from different viewing directions, the configuration of a conveyor installation having an accumulating conveyor SF' equipped with the slotted engagement elements 45 and having an associated (unchanged) running carriage 12.

The invention claimed is:

1. A conveyor installation (10) for the transportation of articles along a predefined path, comprising:
   a running rail (11) and at least one running carriage (12) which runs on said running rail (11) and which is freely movable along the running rail (11),
   a driven engagement device (13; SF') which extends at least in sections along the running rail (11) and which comprises a multiplicity of engagement elements (23, 23', 23"; 45) which are movable along the running rail (11) and which, for the purposes of controlling the movement of the at least one running carriage (12), can be placed in engagement with the running carriage (12),
   wherein the engagement elements (23, 23', 23"; 45) are movable back and forth between two stable positions, wherein the engagement elements (23, 23', 23"; 45) each lock via detent action in each of the two stable positions, wherein, in the first stable position, the engagement elements (23, 23', 23"; 45) are disposed in a non-engagement position and can be moved relative to the at least one running carriage (12) past the running carriage (12) without entering into engagement with the running carriage (12), and wherein, in the second stable position, the engagement elements (23, 23', 23"; 45), during a movement relative to the at least one running carriage (12) past the running carriage (12), compulsorily enter into an engagement position of engagement with the at least one running carriage (12).

2. The conveyor installation according to claim 1, wherein the engagement elements (23, 23', 23"; 45) are, in the engagement device (13, SF'), arranged one behind the other, and so as to be spaced apart uniformly from one another, in a movement direction.

3. The conveyor installation according to claim 1, wherein the engagement elements (23, 23', 23"; 45) are in each case pivotable about a swivel axis (24), and can be moved from one stable position into the other by way of a pivoting movement about the swivel axis (24).

4. The conveyor installation according to claim 1, wherein a detent position of the engagement elements (23, 23', 23"; 45) in the second stable position is configured such that the detent position of one engagement element (23; 45) is eliminated and the engagement element (23; 45) is pivoted into the first stable position if a force acting counter to the movement direction and of a predetermined magnitude acts on said engagement element (23; 45).

5. The conveyor installation according to claim 4, wherein the engagement elements (23, 23', 23"; 45), during the pivoting, move in each case along a detent element (25) which is static relative to the swivel axis (24), and in the two stable positions, each lock with detent action, by way of a recess (23a, b; 45a, b), at the detent element (25).

6. The conveyor installation according to claim 5, wherein the detent element is in the form of a detent bolt (25) oriented parallel to the swivel axis (24), and in that the recesses on the engagement element (23, 23', 23"; 45) are in the form of detent depressions (23a, b; 45a, b).

7. The conveyor installation according to claim 6, wherein the engagement elements (23, 23', 23"; 45) are in the form of approximately V-shaped hooks which lie in the pivoting plane and which have two limbs (S1, S2) which are connected to one another at one side, in that the engagement elements (23, 23', 23"; 45) are in each case pivotably mounted at the free end of the second limb (S2), and in that, at the free end of the first limb (S1), there is formed a contact head (23c; 45c) by way of which the engagement element (23, 23', 23"; 45) enters into engagement, in the engagement position, with the running carriage (12).

8. The conveyor installation according to claim 1, wherein the engagement elements (23, 23', 23"; 45) are attached to a chain (22) which is driven and which is movable in sections along the running rail (11), and in that the swivel axis (24) of each engagement element (23; 45) in each case coincides with a joint axis of the chain (22).

9. The conveyor installation according to claim 8, wherein the chain (22) is in the form of an endless chain and is guided over at least two diverting wheels (27, 28).

10. The conveyor installation according to claim 8, wherein the chain (22), in a section in which it is moved along the running rail (11) for the purposes of engagement, is guided in a guide rail (19) such that the engagement elements (23, 23', 23"; 45) arranged on the chain (22) are situated and move outside the guide rail (19).

11. The conveyor installation according to claim 8, further comprising a mechanism (30, 31, 32; 33-41; 42-44) by way of which engagement elements (23, 23', 23"; 45) situated in the non-engagement position can be moved back into the engagement position.

12. The conveyor installation according to claim 11, wherein the mechanism comprises a static sliding guide (31) which is tracked by the engagement elements (23', 23") that are moved past.

13. The conveyor installation according to claim 12, further comprising means (30, 32) for tracking the sliding guide (31) are arranged on the engagement elements (23', 23").

14. The conveyor installation according to claim 13, wherein the tracking means comprise a tracking roller (30) arranged rotatably on each engagement element (23').

15. The conveyor installation according to claim 13, wherein the tracking means comprise a tracking cam (32) formed on each engagement element (23").

16. The conveyor installation according to claim 11, wherein the mechanism comprises movable pressing means (38, 44) which, in order to pivot the engagement elements (23), are pressed against the engagement elements (23) that are moved past.

17. The conveyor installation according to claim 16, wherein the pressing means comprise, on a synchronously running chain (34), pressing elements (38) which are moved against the engagement elements (23).

18. The conveyor installation according to claim 16, wherein the pressing means comprise at least one static pressing unit (42) with an active element (44) which can be moved against the engagement elements (23) that are moved past.

19. The conveyor installation according to claim 1, wherein the engagement elements (45) are designed such that, in the second stable position, they can allow the running carriage (12) to pass by in the case of a relatively fast movement of the at least one running carriage (12).

20. The conveyor installation according to claim 19, wherein the engagement elements (45) are in the form of approximately V-shaped hooks which lie in a pivoting plane and which have two limbs (S1, S2) which are connected to one another at one side, in that the engagement elements (45) are in each case pivotably mounted at the free end of the second limb (S2), in that, on the free end of the first limb (S1), there is formed a contact head (45c) by way of which the engagement element (45) enters into engagement, in the engagement position, with the running carriage (12), in that the engagement elements (45) are, at least in the region of the limbs (S1, S2), composed of an elastically deformable material, and in that the limbs (S1, S2) of the engagement elements (45) are divided, in each case by a slot (48) lying in the pivoting plane, into two similar limb parts (S1a, b; S2a, b) which are spread apart when a relatively fast-moving running carriage (12) passes by.

21. The conveyor installation according to claim 20, wherein, in the case of the engagement elements (45), in each case on the outer side in the region of the first limb (S1), there is formed a run-in funnel (49) which opens into the slot (48) and which permits or facilitates the spreading-apart of the limb parts (S1a, b; S2a, b) by an engagement element (18) attached to the running carriage (12).

* * * * *